United States Patent
Gong et al.

(10) Patent No.: US 11,538,246 B2
(45) Date of Patent: Dec. 27, 2022

(54) METHOD AND APPARATUS FOR TRAINING FEATURE EXTRACTION MODEL, COMPUTER DEVICE, AND COMPUTER-READABLE STORAGE MEDIUM

(71) Applicant: Tencent Technology (Shenzhen) Company Limited, Shenzhen (CN)

(72) Inventors: Guoping Gong, Shenzhen (CN); Xuyuan Xu, Shenzhen (CN); Tao Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 136 days.

(21) Appl. No.: 17/007,507

(22) Filed: Aug. 31, 2020

(65) Prior Publication Data

US 2020/0394416 A1 Dec. 17, 2020

Related U.S. Application Data

(63) Continuation of application No. PCT/CN2019/092944, filed on Jun. 26, 2019.

(30) Foreign Application Priority Data

Jul. 27, 2018 (CN) .......................... 201810841956.2

(51) Int. Cl.
*G06V 20/40* (2022.01)
*G06F 16/783* (2019.01)
(Continued)

(52) U.S. Cl.
CPC .......... *G06V 20/46* (2022.01); *G06F 16/7837* (2019.01); *G06K 9/6215* (2013.01);
(Continued)

(58) Field of Classification Search
CPC ........ G06V 20/46; G06V 10/25; G06V 10/82; G06F 16/7837; G06K 9/6215; G06K 9/6228; G06K 9/6256; G06K 9/6273
See application file for complete search history.

(56) References Cited

U.S. PATENT DOCUMENTS

| 11,216,694 B2 * | 1/2022 | Jung | ...................... G06V 10/82 |
| 2009/0141940 A1 * | 6/2009 | Zhao | ...................... G06V 20/40 |
| | | | 382/103 |

(Continued)

FOREIGN PATENT DOCUMENTS

| CN | 107609477 | 1/2018 |
| CN | 107679455 | 2/2018 |

(Continued)

OTHER PUBLICATIONS

International Search Report dated Jan. 30, 2020 in International Application No. PCT/CN2019/092944. (5 pages).

(Continued)

*Primary Examiner* — Aaron W Carter
(74) *Attorney, Agent, or Firm* — ArentFox Schiff LLP

(57) ABSTRACT

Aspects of the disclosure provide a method and an apparatus for training a feature extraction model, a computer device, and a computer-readable storage medium that belong to the field of video processing technologies. The method can include detecting a plurality of images in one or more sample videos and obtaining at least two images including the same object. The method can further include determining the at least two images including the same object as sample images, and training according to the determined sample images to obtain the feature extraction model, where the feature extraction model is used for extracting a video feature of the video.

20 Claims, 5 Drawing Sheets

(51) Int. Cl.
  *G06K 9/62* (2022.01)
  *G06V 10/25* (2022.01)

(52) U.S. Cl.
  CPC ......... *G06K 9/6228* (2013.01); *G06K 9/6256* (2013.01); *G06V 10/25* (2022.01)

(56) References Cited

U.S. PATENT DOCUMENTS

| | | | | |
|---|---|---|---|---|
| 2012/0237081 | A1* | 9/2012 | Datta | G06V 20/53 382/103 |
| 2012/0301014 | A1 | 11/2012 | Xiao et al. | |
| 2014/0003709 | A1* | 1/2014 | Ranganathan | G06V 20/588 382/201 |
| 2016/0034786 | A1* | 2/2016 | Suri | G06V 20/46 382/159 |
| 2017/0161590 | A1* | 6/2017 | Boulkenafed | G06V 10/82 |
| 2020/0090682 | A1* | 3/2020 | Liu | G10L 25/21 |
| 2020/0117946 | A1* | 4/2020 | Che | G06K 9/00 |
| 2020/0193207 | A1* | 6/2020 | Kim | G06K 9/6247 |
| 2020/0380721 | A1* | 12/2020 | Rampal | G06K 9/6262 |
| 2020/0394416 | A1* | 12/2020 | Gong | G06K 9/6228 |
| 2020/0401808 | A1* | 12/2020 | Wu | G06N 3/08 |
| 2021/0027438 | A1* | 1/2021 | Yang | G06T 5/40 |
| 2021/0281918 | A1* | 9/2021 | Su | H04N 21/251 |
| 2021/0357652 | A1* | 11/2021 | Wu | G06V 10/56 |
| 2021/0398294 | A1* | 12/2021 | Cui | G06T 7/194 |
| 2022/0044004 | A1* | 2/2022 | Zeng | G06V 10/993 |

FOREIGN PATENT DOCUMENTS

| | | |
|---|---|---|
| CN | 109086709 | 12/2018 |
| WO | WO 2019/041519 | 3/2019 |

OTHER PUBLICATIONS

Written Opinion dated Jan. 30, 2020 in International Application No. PCT/CN2019/092944. (4 pages).

* cited by examiner

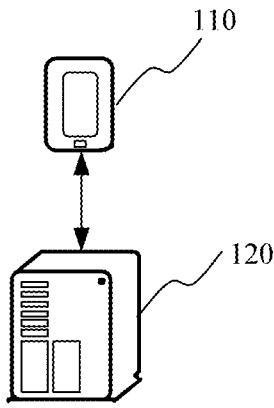

FIG. 1A

| A terminal detects a plurality of images in a sample video, and obtains at least two images including the same object, the at least two images being used for describing a change of the object in a time dimension, and there being one or more sample videos | 101 |

↓

| The terminal determines the at least two images including the same object as sample images | 102 |

↓

| The terminal trains according to the determined sample images, to obtain a feature extraction model | 103 |

↓

| The terminal obtains at least one image in a target video, and performs feature extraction on the at least one image based on the feature extraction model, to obtain a video feature of the target video | 104 |

FIG. 1B

METHOD AND APPARATUS FOR TRAINING FEATURE EXTRACTION MODEL, COMPUTER DEVICE, AND COMPUTER-READABLE STORAGE MEDIUM

RELATED APPLICATION

This application is a continuation of International Application No. PCT/CN2019/092944, filed on Jun. 26, 2019, which claims priority to Chinese Patent Application No. 201810841956.2, entitled "METHOD AND APPARATUS FOR TRAINING FEATURE EXTRACTION MODEL, AND STORAGE MEDIUM" and filed on Jul. 27, 2018. The entire disclosures of the prior applications are hereby incorporated by reference in their entirety.

FIELD OF THE TECHNOLOGY

Embodiments of this application relate to the field of video processing technologies, including a method and an apparatus for training a feature extraction model, a computer device, and a computer-readable storage medium.

BACKGROUND OF THE DISCLOSURE

With the rapid development of Internet technologies and the booming of Internet videos, video identification has been widely applied to a plurality of fields, such as video recommendation, copyright detection, target tracking, and video surveillance. Video feature extraction is a key step of video identification. To improve the accuracy of video features, usually, a feature extraction model may be first trained, and a video feature is extracted based on the feature extraction model.

At the stage of training the feature extraction model, a plurality of images in at least one sample video are obtained, and enhancement, such as image scaling or translation is performed on the plurality of images, and a plurality of processed images are determined as sample images. Training is performed according to the determined plurality of sample images, to obtain the feature extraction model. At the stage of video identification, for a to-be-identified target video, a plurality of images in the target video are selected, and the plurality of images are inputted into the trained feature extraction model, and video features of the target video may be obtained based on the feature extraction model.

In the foregoing solution, when the sample images are selected, a change of video data in a time dimension is not considered. Consequently, anti-noise performance of the feature extraction model in the time dimension is relatively poor, affecting the accuracy of extracted video features.

SUMMARY

According to various exemplary embodiments of this application, a method and an apparatus for training a feature extraction model, a computer device, and a computer-readable storage medium are provided.

An exemplary embodiment can provide a method for training a feature extraction model that can be performed by a computer device. The method can include detecting a plurality of images in one or more sample videos, and obtaining at least two images including the same object, the at least two images indicating a change of the object in a time dimension. The method can further include determining the at least two images including the same object as sample images, and training according to the determined sample images, to obtain the feature extraction model, the feature extraction model being used for extracting a video feature of the video.

A further exemplary embodiment can provide an apparatus for training a feature extraction model. The apparatus can include processing circuitry that is configured to detect a plurality of images in one or more sample videos, and obtain at least two images including the same object, the at least two images indicating a change of the object in a time dimensions. The processing circuitry can be further configured to determine the at least two images including the same object as sample images, and train according to the determined sample images, to obtain the feature extraction model, the feature extraction model being used for extracting a video feature of the video.

An embodiment can also provide a computer device, including a processor and a memory, the memory storing at least one instruction that, when executed by the processor, causes the processor to perform the operations of the method for training a feature extraction model.

Aspects of the disclosure can also provide a non-transitory computer-readable storage medium storing at least one instruction that, when executed by a processor, causes the processor to perform the operations of the method for training a feature extraction model.

Details of one or more embodiments of this application are provided in the following accompany drawings and descriptions. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. The accompanying drawings in the following description show only some exemplary embodiments of this application, and a person of ordinary skill in the art may still derive other accompanying drawings from these accompanying drawings.

FIG. 1A is a schematic structural diagram of an implementation environment according to an embodiment of this application.

FIG. 1B is a flowchart of a method for training a feature extraction model according to an embodiment of this application.

DESCRIPTION OF EMBODIMENTS

Figure 2:
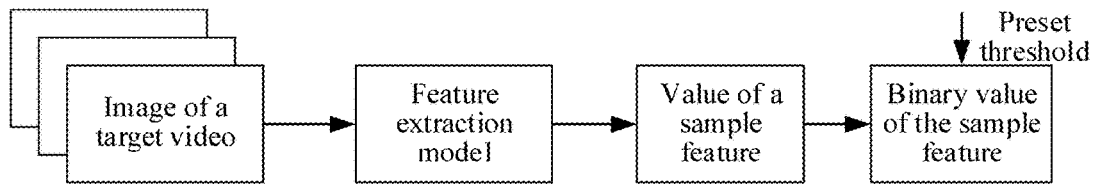
FIG. 2 is a schematic flowchart of feature extraction according to an embodiment of this application.

The following describes the technical solutions in exemplary embodiments of this application with reference to the accompanying drawings in the embodiments of this application. The described embodiments are some of embodiments of this application rather than all of the embodiments. All other embodiments obtained by a person of ordinary skill in the art based on the exemplary embodiments of this application shall fall within the protection scope of this application.

In the related art, when the feature extraction model is trained, usually, a plurality of images in at least one sample video are obtained, enhancement is performed on the plurality of images, and the processed images are used as sample images. Training is performed according to the determined plurality of sample images, to obtain the feature extraction model. By performing enhancement on the images, anti-noise performance of the feature extraction model in a spatial dimension may be improved.

However, a video includes spatial dimension information and time dimension information. In the foregoing related art, a change of the video in a time dimension is not considered. Consequently, the feature extraction model cannot learn a change of the video in the time dimension, and has relatively poor anti-noise performance in the time dimension. When video features are extracted based on the feature extraction model, the accuracy of the video features is affected. For example, when an object in the video deforms, the feature extraction model cannot learn the deformation. To be specific, a video obtained after the video deforms cannot be detected based on the feature extraction model, and the identification accuracy is low.

However, in the embodiments of this application, for each sample video, at least two images including the same object are determined as sample images. The at least two images may describe a change of the same object in a time dimension. Therefore, the change of the video in the time dimension is fully considered, and during construction of sample images, global information and partial information are both considered, enriching the diversity of samples. In this way, during training according to the sample images, the feature extraction model may learn the change of the video in the time dimension, thereby improving the anti-noise performance in the time dimension. Even if the video deforms, the feature extraction model has relatively good anti-noise performance, and can accurately identify the video after deformation. In addition, in the embodiments of this application, abstract representation of a sample image is learned by training the feature extraction model. When video identification is performed based on the feature extraction model, the accuracy of identifying a video may be greatly improved when a high recall rate is ensured. Compared with another video feature extraction method, the method in this application has better anti-noise effects for various video processing manners such as duration scaling, pixel scaling, and contrast ratio adjustment.

The embodiments of this application may be applied to a video recommendation scenario. For example, in the video recommendation scenario, the method provided in the embodiments of this application may be used. To be specific, a video feature of a video played by a user is obtained, a video feature of each video in a database is obtained, and a video having a video feature similar to that of the video played by the user is selected therefrom, and the selected video is recommended to the user.

The embodiments of this application may be applied to a copyright detection scenario. For example, in the copyright detection scenario, the collected video information and video feature of each video are correspondingly stored in the database. When repetition detection is to be performed on a target video, a video feature of the target video is obtained, and video information corresponding to the video feature is searched in the database, to detect a video having content repeating that of the target video. By using the foregoing copyright detection manner, an original releaser of each video may be accurately determined, reward data is provided for the original releaser, and originality protection is provided for the original releaser, to encourage more video releasers to provide more high-quality videos. In addition, copied videos can be found in time, to purify in-stock videos of the Internet, and improve the video quality.

Of course, it should be understood that the embodiments of this application may also be applied to a plurality of scenarios such as video clip identification, video surveillance, target tracking, and detection of opening and closing credits.

FIG. 1A is a schematic diagram of an implementation environment according to an embodiment of this application. Referring to FIG. 1A, the implementation environment includes a terminal 110 and a server 120, which are connected to each other through a network. The terminal 110 and the server 120 may both be configured to extract video features of a video.

Description is made by using the server 120 as an example. In a video recommendation scenario, the server 120 may obtain a video feature of a newly released video, and store the video feature into a database. In a process in which the terminal 110 plays the video, the server 120 may collect a video play record of the terminal 110. For each played video in the video play record, a video feature of the video is obtained, and a newly released video with a similar video feature is selected from the database, and pushed to the terminal 110. The terminal 110 displays the newly released video to a user, to achieve the objective of recommending a new video to the user.

In a copyright detection scenario, the server 120 stores video information and a video feature of a released video to a database. When the terminal 110 sends a new video to the server 120 and requests to release the video, the server 120 obtains the video feature of the video, and compares the video feature with a video feature of each video in the database. When it is determined that there is no video with a video feature the same as or similar to that of the video, it is determined that the video is an original video, and a terminal user is an original releaser of the video, and the video is allowed to be released. Subsequently, the video information and the video feature of the video are also stored into the database.

When the terminal 110 subsequently sends a repetition detection request of the video to the server 120, the server 120 may compare the video feature of the video with a video feature of another video, to find a video feature similar to the video feature and video information corresponding to the similar video feature, for transmission to the terminal 110, to provide related information of a copied video to the original releaser, helping the original releaser protect legal rights of the original video. The video feature of the video may also be obtained by using the foregoing implementation environment in another scenario.

FIG. 1B is a flowchart of a method for training a feature extraction model according to an embodiment of this application. The method for training a feature extraction model may be applied to the terminal 110 or the server 120 shown in FIG. 1A. In this embodiment of this application, description is provided by using an example in which the method is applied to the terminal 110. Referring to FIG. 1B, the method includes the following steps.

In step 101, the terminal detects a plurality of images in a sample video, and obtains at least two images including the same object, the at least two images indicating a change of the object in a time dimension, and there being one or more sample videos.

In step 102, the terminal determines the at least two images including the same object as sample images. The terminal may be a terminal such as a mobile phone or a computer, or may be a server, such as a video server associated with a video play website, or a model management server dedicatedly configured to train a model. When the terminal wants to train the feature extraction model, the terminal obtains the sample video, there being one or more (that is, at least one) sample videos. The sample video may be a video collected from the Internet by the terminal, such as a video uploaded by a user on the video play website, or a video sent by a video provider. Next, for each of the sample videos, the terminal may detect a plurality of images in the sample video, and obtain at least two images including the same object.

The plurality of images may be all images in the sample video, or one or more images obtained through sampling in the sample video. The object is an object that appears in the sample video, for example, a person, an animal, a plant, a weather element such as rain or snow, or a scenery such as rivers and hills.

When an image is detected, a plurality of feature points may be extracted from the image. The plurality of feature points are matched with feature points of one or more preset objects, to determine a preset object matching the plurality of feature points, that is, the object included in the image. The preset object may include a common object or a weather element in life, a pre-obtained human face image, or a scenery such as rivers and hills.

The sample video may include at least one object, and the sample video includes a plurality of images arranged in a chronological order. Then, the at least one object may change in location or pose in the plurality of images of the sample video, and a data change is generated in the time dimension. Therefore, a training apparatus obtains at least two images including the same object through detection, and the at least two image may be used for describing a change of the same object in a time dimension. In this way, when the feature extraction model is trained by using the at least two images, the feature extraction model may learn the change of the same object in the time dimension, to improve the anti-noise performance of the feature extraction model in the time dimension.

In a possible implementation, the terminal may detect a first image in the sample video, determine a first object included in the first image, track the first object in an image other than the first image, to obtain a second image including the first object, and determine both the first image and the second image as the sample images. The first image may be any image in the sample video, for example, the first image, the last image, or an image with a largest quantity of times of playing. The second image may be an image subsequent to the first image in the time dimension, or an image previous to the first image in the time dimension. The first image and the second image may describe a change of the first object in the time dimension.

Optionally, when the first object is tracked in the image other than the first image, a feature point may be extracted, by using a preset feature extraction algorithm, in a region in which the first object in the first image is located, and then forward tracking and backward tracking are performed starting from the first image, and a location of a feature point in a next image is determined according to the feature point in a previous image by using a feature point matching algorithm, to determine a region in which the first object in the next image is located, and the first object in the next image is detected. By such analogy, all images including the first object may be detected. The preset feature extraction algorithm may be a features from accelerated segment test (FAST) detection algorithm, a Shi-Tomasi corner detection algorithm, or the like. The feature point matching algorithm may be a Lucas-Kanade optical flow algorithm, or another algorithm.

The first object may appear more than twice in the sample video, resulting in that there are more than two images including the first object in the sample video. Therefore, the terminal may track the first object in the image other than the first image, to obtain a plurality of other images including the first object.

In this case, the plurality of other images are all used as second images. Alternatively, one or more images with a distance from the first image greater than a preset distance are selected from the plurality of other images, to obtain a second image including the first object. The distance between two images is a quantity of images between the two images. The preset distance may be a value such as 2 or 3, and is specifically comprehensively determined according to a sample image quantity requirement and a quantity of images including the object. Alternatively, a last image in a time dimension is selected from the plurality of other images, to obtain a second image including the first object. In this way, it may be ensured that the second image is relatively far away from the first image in the time dimension, so that the change of the first object can be fully presented.

In this embodiment of this application, the first object is used merely as an example for description, in addition to the first object, the terminal may further detect another object existing in the sample video. An operation similar to that performed on the first object is performed on each object, so that at least two images including a corresponding object are obtained for a plurality of objects, and the obtained images are determined as sample images.

When obtaining the at least two images including the same object, the terminal may further perform enhancement on the at least two images, and determine processed images as sample images, to improve the anti-noise performance of the feature extraction model in a spatial dimension, thereby improving the accuracy of video features.

The enhancement may include a plurality of processing manners such as scaling, translation, rotation, contrast ratio adjustment, cutting, black box adding, subtitle adding, flag adding, and the like. In a possible implementation, the terminal may perform enhancement on each obtained image by using an enhancement tool.

In the sample video, in addition to the foregoing images including the same object, other images may be additionally selected as sample images. For example, the first image and the last image in the time dimension are selected from the sample video as sample images, and sampling is performed in the sample video according to a predetermined sampling frequency, to obtain a plurality of sample images. Alternatively, after enhancement is performed on the selected images, the processed images are determined as the sample images, to improve the anti-noise performance of the feature extraction model in a spatial dimension, thereby improving the accuracy of video features.

In step 103, the terminal trains according to the determined sample images, to obtain the feature extraction model. The terminal may initialize the feature extraction model, and when determining a plurality of sample images, train the feature extraction model according to each of the plurality of sample images, adjust a model parameter in the feature extraction model, and further obtain a trained feature extraction model. In a subsequent process, the feature extraction model may be used for extracting a video feature of the video, to distinguish the video by using the video feature.

Training algorithms used by the terminal may be a plurality of algorithms such as a deep learning algorithm, a support vector machine algorithm, a convolutional neural network algorithm, and a recurrent neural network algorithm. Different training algorithms may be used for training to obtain different network models.

Using the deep learning algorithm as an example, a deep learning network model may be obtained through training by using the deep learning algorithm and is used as a feature extraction model. The deep learning network model includes a plurality of network layers such as a convolutional layer, a pooling layer, a nonlinear layer, and a fully-connected layer. Each network layer includes a plurality of feature graphs, and each feature graph includes a plurality of feature elements. A preset quantity of first network layers may be referred to as network shallow layers, and network layers after the network shallow layers are referred to as network deep layers. A 7*7 convolution kernel may be used in each network shallow layer, and a quantity of feature graphs is set to 32. A 3*3 convolution kernel may be used in each network deep layer, and quantities of nodes of neurons in the last two fully-connected layers are respectively set to 128 and 32. Compared with a large-sized convolution kernel, a small convolution kernel may reduce the amount of calculation as well as improve the depth of the network model, and also improve the speed and the accuracy. The size of the convolution kernel, the quantity of feature graphs, and the quantity of feature elements in the deep learning network model may alternatively use other values.

In a possible implementation, the terminal may first obtain a label of each sample image. The label is used for distinguishing whether the sample image is similar to another sample image. For example, a plurality of sample images may be divided into two types. For one type, a first label is used for labeling, and for the other type, a second label may be used for labeling. The first label and the second label may be different labels. For example, when the first label is 1, the second label is 0, and when the first label is 0, the second label is 1. Next, the feature extraction model is trained according to each of the plurality of sample images and a label of each sample image, to further obtain a trained feature extraction model. A label of each sample image may be obtained through manual labeling, or obtained through calculation by using an unsupervised classification algorithm.

Referring to FIG. 2, the feature extraction model includes an input layer, an intermediate layer, and an output layer. Any sample image is inputted into the input layer, and after calculation by the input layer and the intermediate layer, the last intermediate layer outputs a value of the sample feature to the output layer, the value being a float. In the output layer, the value of the sample feature is compared with a preset threshold. If the value is greater than or equal to the preset threshold, it is determined that a binary value corresponding to the value of the sample feature is 1; or if the value is less than the preset threshold, it is determined that a binary value corresponding to the value of the sample feature is 0, so that binarization of the sample feature is implemented in the output layer.

Figure 3:
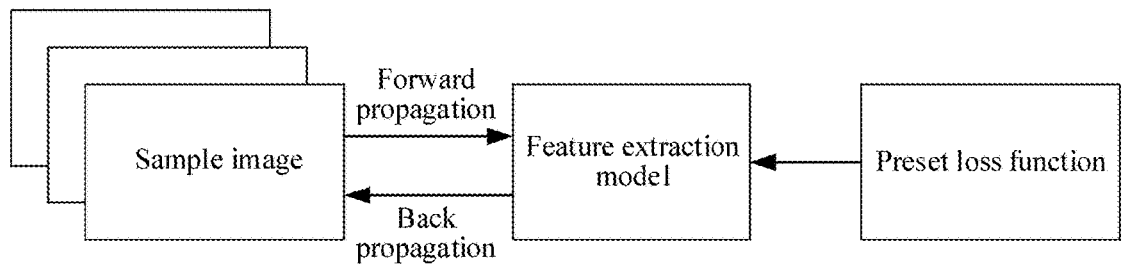
FIG. 3 is a schematic diagram of training a feature extraction model according to an embodiment of this application.

In another possible implementation, referring to FIG. 3, the terminal may train according to a plurality of sample images and a preset loss function, to obtain the feature extraction model, so that the feature extraction model meets a target that the preset loss function is minimum.

The preset loss function includes at least the following information entropy loss function:

$$L_b = \sum_d (u - 0.5)^2;$$

$L_b$ representing the information entropy loss function, and u representing a sample feature average value of the plurality of determined sample images.

For example, a sample feature of each sample image includes values in c dimensions, and for d sample images, an average value of values of d sample features in each of the c dimensions may be calculated to obtain a c-dimensional vector, and the values in the c-dimensional vector are added to obtain a sample feature average value u. Both c and d are positive integers.

The foregoing information entropy loss function is determined according to a difference between the sample feature average value u of the plurality of sample images and 0.5. When the information entropy loss function reaches minimum, it may be ensured that the sample feature average value u is approximate to 0.5. Therefore, when training is performed according to the information entropy loss function and the plurality of sample images, it may be ensured that a ratio of sample images with a sample feature 1 to sample images with a sample feature 0 may be balanced, and sample features are evenly distributed, so that the information entropy is maximized, and the information amount is improved.

In addition, the preset loss function may further include a distance loss function and a quantification loss function.

The distance loss function is as follows: $L_t = \max\{(x_a - x_p) + m - (x_a - x_n), 0\}$, where Lt represents the distance loss function, xa represents a sample feature of any specified sample image, xp represents a sample feature of a sample image with a label the same as that of the specified sample image, xn represents a sample feature of a sample image with a label different from that of the specified sample image, m represents a distance constant, and m being greater than 0, where m may be a float.

$$L_q = \begin{cases} x^2, & x < 0.5 \\ (x-1)^2, & x \geq 0.5 \end{cases},$$

The quantification loss function is as follows:
where $L_q$ represents the distance loss function, x represents any value in a sample feature of any sample image, x being greater than 0, where x may be a float.

The foregoing distance loss function is determined according to a distance between a sample image and a sample image with the same label and a distance between a sample image and a sample image with a different label. When the distance loss function reaches minimum, it may be ensured that a distance between sample images with the same label is minimum and a distance between sample images with different labels is maximum. Therefore, when training is performed according to the distance loss function and the plurality of sample images, the sample images may be accurately divided, so that the accuracy of sample feature is improved, thereby improving the accuracy of the feature extraction model.

The foregoing quantification loss function is determined according to values in a plurality of sample features. When the quantification loss function reaches minimum, it may be ensured that a value in the sample feature is 0 or 1, so that the feature extraction model converges the sample feature to 0 or 1 in a training process, and the loss after binarization reaches minimum.

For example, $L=\alpha L_t+\beta L_q+\lambda L_b$, where L represents the preset loss function, $\alpha$, $\beta$, and $\gamma$ representing weights of the distance loss function, the quantification loss function, and the information entropy loss function, and may be set according to requirements. For example, $\alpha$, $\beta$, and $\gamma$ are all equal to 1. By adjusting the values of $\alpha$, $\beta$, and $\gamma$, the degree of affecting, by the loss functions, the preset loss function may be adjusted.

In step 104, the terminal obtains at least one image in a target video, and performs feature extraction on the at least one image based on the feature extraction model, to obtain a video feature of the target video. The target video is a video of which a feature is to be extracted, and may be any video played online, a to-be-queried video submitted by a user, a video sent by another device, or the like. When the video feature of the target video is to be extracted, at least one image in the target video is obtained. The at least one image may include all images in the target video, or may include an image collected from the target video according to a sampling frequency, or the like. Next, the at least one image is inputted into the feature extraction model, and feature extraction is performed on the at least one image based on the feature extraction model, to obtain a video feature of the target video.

In a possible implementation, the terminal may create a database, the database being used for correspondingly storing a video feature and video information of each video. When obtaining a video feature of the target video and video information of the target video, the terminal correspondingly stores the video feature and the video information into the database. In addition, the target video itself may also be stored into the database.

The video information includes at least a video identifier. The video identifier is used for determining a uniquely corresponding video, and may be a video name, a video number, or the like. According to the video identifier, the target video may be determined from a large quantity of videos. In addition, the video information may further include a release time, a storage time, a storage address, and the like of the target video.

Optionally, when the video feature and the video information of the target video are obtained, an inverted index is established, to obtain the video information corresponding to the video feature.

Further, to help distinguish among a plurality of videos, the terminal may use a bucketing manner. To be specific, a data bucket is created for each video, and a video feature and video information of the video are stored in the data bucket, and a decimal value corresponding to the video feature is used as a data bucket identifier, so that data buckets of different videos are distinguished, to help subsequently identify a corresponding data bucket according to a video feature of any video, and find video information in the data bucket.

Optionally, before storing the video feature and the video information of the target video, the terminal may first determine whether the video feature of the target video meets a preset condition. The preset condition is used for specifying a storage condition of the video feature. Only when the video feature of the target video meets the preset condition, the video feature and the video information of the target video are allowed to be stored. For example, the preset condition may be that there is no repeated video in the database. When a video has the same video feature in the database, it indicates that the target video overlaps an earlier video, and in this case, the video feature and the video information of the video cannot be stored.

In another possible implementation, when the terminal obtains the video feature of the target video, the terminal queries, in the database, the video information corresponding to the video feature, to identify the target video.

Optionally, if the video feature and the video information of each video are stored in the database in a bucketing manner, the terminal may obtain the video feature of the target video, and calculate a decimal value corresponding to the video feature, and use the decimal value as a data bucket identifier. Video information is obtained from a data bucket corresponding to the data bucket identifier, and a video with a video feature the same as that of the target video may be found according to the video information.

Figure 4:
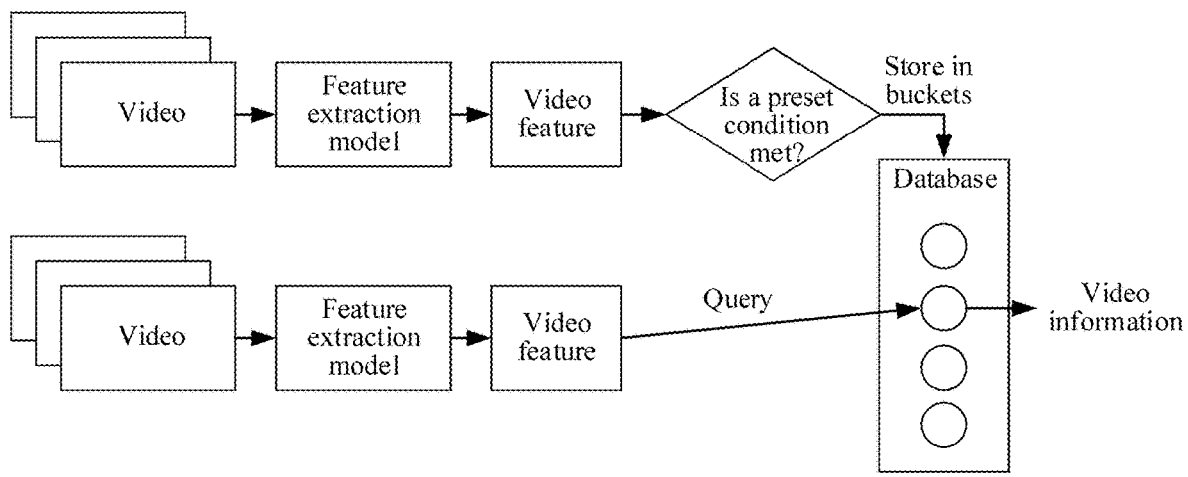
FIG. 4 is a schematic diagram of an operation process according to an embodiment of this application.

FIG. 4 is a schematic diagram of an operation process according to an embodiment of this application. For a to-be-stored video, a video feature of the video may be obtained based on a feature extraction model. After it is determined that the video feature meets a preset condition, the video feature and video information may be correspondingly stored into a data bucket corresponding to a decimal value of the video feature in a bucketing manner.

Next, for a to-be-identified video, a video feature of the video may be obtained based on the feature extraction model, and a decimal value corresponding to the video feature is determined, so that the video information corresponding to the video feature is queried in a data bucket corresponding to the decimal value, to identify the video.

In this embodiment of this application, description is provided by using an example in which the terminal performs feature extraction based on the feature extraction model. In another embodiment, after training the feature extraction model, the terminal may provide the feature extraction model to another device, and the another device performs feature extraction and video identification based on the feature extraction model.

For example, the terminal provides the feature extraction model to a video server of a video play website. The video server may extract a video feature of each video based on the feature extraction model, to perform an operation of querying a video or detecting a repeated video according to the video feature of each video.

According to the method provided in this embodiment of this application, a plurality of images in each of sample videos are detected, and at least two images including the same object are obtained. The at least two images including the same object can be determined as sample images, and training can be performed according to the determined sample images in order to obtain the feature extraction model, the feature extraction model being used for extracting a video feature of the video. The at least two images including the same object may describe a change of an object in a time dimension. Therefore, when the feature extraction model is obtained through training according to the determined sample images, a change of video data in a time dimension may be considered, so that anti-noise performance of the feature extraction model in the time dimension is improved, thereby improving the accuracy and robustness of the extracted video features.

In addition, a loss function used in the related art is as follows:

$$L_t = \sum_{i=1}^{N} \left( \frac{1}{2}(1 - y_i)\|b_{i,1} - b_{i,2}\|_2^2 + \frac{1}{2}y_i \max(m - \|b_{i,1} - b_{i,2}\|_2^2, 0) + \alpha(|\|b_{i,1}| - 1|\|_1 + |\|b_{i,2}| - 1|\|_1) \right);$$

any two same sample images are combined into a sample pair, to obtain N sample pairs; $L_t$ represents the loss function, $y_i$ represents a label of an $i^{th}$ sample pair, $b_{i,1}$ represents a sample feature of the first sample in the $i^{th}$ sample pair, $b_{i,2}$ represents a sample feature of the second sample in the $i^{th}$ sample pair, a represents a weight of a binary hash function, m represents a distance constant, i and N are positive integers, and m is greater than 0.

When the feature extraction model is trained, the loss function does not perform ratio balance control on the sample features. As a result, a ratio of sample features with a value 1 to sample features with a value 0 is imbalanced, and there is a large amount of redundant information, that is, loss of an information entropy is relative large.

In the method provided in this embodiment of this application, the preset loss function is used. The preset loss function includes at least the information entropy loss function, so that when the feature extraction model is trained, a ratio of values of the sample features can be controlled according to the information entropy loss function, to ensure that the ratio of the sample images with the sample feature 1 to the sample images with the sample feature 0 may be balanced, and the sample features are evenly distributed, so that the information entropy is maximized, and the information amount is improved. When the video feature is applied to a video identification process, higher accuracy and a higher recall rate may be achieved.

FIG. 1B, FIG. 2, FIG. 3, and FIG. 4 are schematic flowcharts of an exemplary method for training a feature extraction model according to an embodiment. It may be understood that, the steps in the flowcharts of FIG. 1B, FIG. 2, FIG. 3, and FIG. 4 are displayed in sequence based on indication of arrows, but the steps are not necessarily performed sequentially based on the sequence indicated by the arrows. Unless explicitly specified in this application, the sequence of the steps is not strictly limited, and the steps may be performed in other sequences. In addition, at least some steps in FIG. 1B, FIG. 2, FIG. 3, and FIG. 4 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step. It may be understood that, the method in FIG. 1B, FIG. 2, FIG. 3, and FIG. 4 may be separately performed by a computer device such as a server or a terminal, or may be jointly performed by a terminal and a server.

Figure 5:
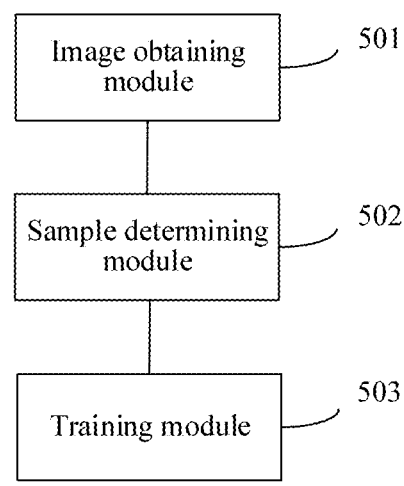
FIG. 5 is a schematic structural diagram of an apparatus for training a feature extraction model according to an embodiment of this application.

FIG. 5 is a schematic structural diagram of an apparatus for training a feature extraction model according to an embodiment of this application. Referring to FIG. 5, the apparatus can include an image obtaining module 501 that is configured to perform the step of obtaining at least two images including the same object in the foregoing embodiment, a sample determining module 502 that is configured to perform the step of determining sample images in the foregoing embodiment, and a training module 503 that is configured to perform the step of training according to the determined sample images, to obtain the feature extraction model in the foregoing embodiment. Of course, it should be understood that one or more of the modules described in this disclosure can be implemented by processing circuitry.

Optionally, the image obtaining module 501 can further include a detection unit that is configured to perform the step of detecting a first image in the sample video, to determine a first object included in the first image in the foregoing embodiment, and a tracking unit that is configured to perform the step of tracking the first object in an image other than the first image, to obtain a second image including the first object in the foregoing embodiment.

The tracking unit can further include a tracking subunit that is configured to perform the step of tracking the first object in the image other than the first image, to obtain a plurality of other images including the first object in the foregoing embodiment, and a selection subunit that is configured to perform the step of selecting, from the plurality of other images, an image with a distance from the first image greater than a preset distance, or, selecting a last image from the plurality of other images, to obtain the second image including the first object in the foregoing embodiment.

Further, the training module 503 can be configured to perform the step of training according to the determined sample images and a preset loss function, to obtain the feature extraction model, so that the feature extraction model meets a target that the preset loss function is minimum in the foregoing embodiment;

the preset loss function including at least the following information entropy loss function:

$$L_b = \sum_d (u - 0.5)^2;$$

$L_b$ representing the information entropy loss function, and u representing a sample feature average value of the determined sample images.

the preset loss function including at least the following information entropy loss function:

$$L_b = \sum_d (u - 0.5)^2;$$

$L_b$ representing the information entropy loss function, and u representing a sample feature average value of the determined sample images.

Optionally, the preset loss function further includes a distance loss function and a quantification loss function;

the distance loss function is as follows: $L_t = \max\{(x_a - x_p) + m - (x_a - x_n), 0\}$;

the quantification loss function is as follows:

$$L_q = \begin{cases} x^2, & x < 0.5 \\ (x - 1)^2, & x \geq 0.5 \end{cases},$$

where $L_t$ represents the distance loss function, $x_a$ represents a sample feature of any specified sample image, $x_p$ represents a sample feature of a sample image with a label the same as that of the specified sample image, $x_n$ represents a sample feature of a sample image with a label different from that of the specified sample image, m represents a distance constant, and m being greater than 0; $L_q$ represents the distance loss function, x representing any value in a sample feature of any sample image, and x being greater than 0.

Optionally, the apparatus further includes a target obtaining module that is configured to perform the step of obtaining at least one image in a target video in the foregoing embodiment, and a feature extraction module that is configured to perform the step of performing feature extraction on the at least one image based on the feature extraction model, to obtain a video feature of the target video in the foregoing embodiment.

When the apparatus for training a feature extraction model provided in the foregoing embodiment trains the feature extraction model, only division of the foregoing function modules is used as an example for description. In the practical application, the functions may be allocated to and completed by different function modules according to requirements. That is, an internal structure of the training apparatus is divided into different function modules, to complete all or some of the functions described above. In addition, the embodiments of the apparatus for training a feature extraction model and the method for training a feature extraction model provided in the foregoing embodiments belong to one conception. For the specific implementation process, reference may be made to the method embodiment.

Figure 6:
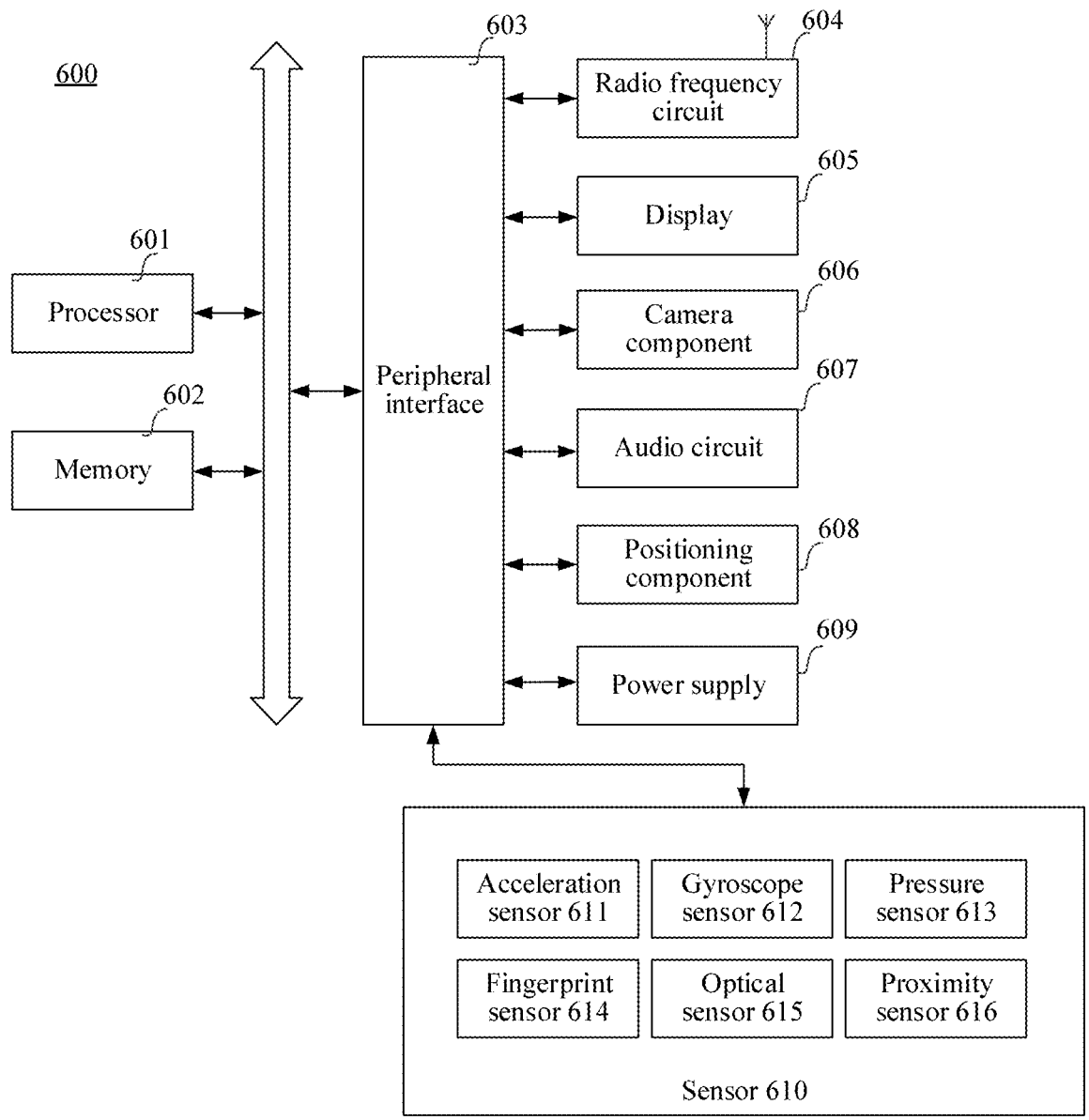
FIG. 6 is a schematic structural diagram of a terminal according to an embodiment of this application.

FIG. 6 is a structural block diagram of a terminal 600 according to an exemplary embodiment of this application. The terminal 600 may be a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, or any another smart terminal. The terminal 600 may also be referred to as another name such as user equipment, a portable terminal, a laptop terminal, or a desktop terminal.

Generally, the terminal 600 includes processing circuitry, such as a processor 601, and a memory 602. The processor 601 may include one or more processing cores, for example, may be a 4-core processor or a 5-core processor. The processor 601 may be implemented in at least one hardware form of digital signal processing (DSP), a field-programmable gate array (FPGA), and a programmable logic array (PLA). The processor 601 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 601 may be integrated with a graphics processing unit (GPU). The GPU is configured to be responsible for rendering and drawing content that a display needs to display. In some embodiments, the processor 601 may further include an artificial intelligence (AI) processor. The AI processor is configured to process a calculation operation related to machine learning.

The memory 602 may include one or more computer-readable storage media. The computer-readable storage medium may be non-transitory. The memory 602 may further include a high-speed random access memory and a non-volatile memory such as one or more magnetic disk storage devices and a flash storage device. In some embodiments, the non-transitory computer-readable storage medium in the memory 602 is configured to store at least one instruction, and the at least one instruction is configured to be executed by the processor 601 to implement the method for training a feature extraction model according to the method embodiment of this application.

In some embodiments, the terminal 600 further optionally includes a peripheral interface 603 and at least one peripheral. The processor 601, the memory 602, and the peripheral interface 603 may be connected through a bus or a signal cable. Each peripheral may be connected to the peripheral interface 603 through a bus, a signal cable, or a circuit board. Specifically, the peripheral includes: at least one of a radio frequency (RF) circuit 604, a display 605, a camera component 606, an audio circuit 607, a positioning component 608, and a power supply 609. The peripheral interface 603 may be configured to connect at least one peripheral related to input/output (I/O) to the processor 601 and the memory 602. The RF circuit 604 is configured to receive and transmit an RF signal, which is also referred to as an electromagnetic signal. The display 605 is configured to display a user interface (UI). The UI may include a graph, text, an icon, a video, and any combination thereof. When the display 605 is a touch display, the display 605 is further capable of acquiring a touch signal on or above a surface of the display 605. The camera component 606 is configured to acquire an image or a video. The audio circuit 607 may include a microphone and a speaker. The microphone is configured to: acquire sound waves of a user and an environment, and convert the sound waves into electrical signals and input the electrical signals into the processor 601 for processing, or input the electrical signals into the RF circuit 604 to implement speech communication. The positioning component 608 is configured to locate a current geographic location of the terminal 600, to implement a navigation or a location based service (LBS). The power supply 609 is configured to supply power for various components in the terminal 600. The power supply 609 may be an alternating current, a direct current, a disposable battery, or a rechargeable battery.

In some embodiments, the terminal 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616. The acceleration sensor 611 may detect accelerations on three coordinate axes of a coordinate system established by the terminal 600. The gyroscope sensor 612 may detect a body direction and a rotation angle of the terminal 600. The gyroscope sensor 612 may cooperate with the acceleration sensor 611 to collect a 3D action by the user on the terminal 600. The pressure sensor 613 may be disposed on a side frame of the terminal 600 and/or a lower layer of the display 605. When the pressure sensor 613 is disposed on the side frame of the terminal 600, a holding signal of the user to the terminal 600 may be detected, and left/right hand identification and a quick operation may be performed by the processor 601 according to the holding signal collected by the pressure sensor 613. When the pressure sensor 613 is disposed on the lower layer of the display 605, the processor 601 controls an operable control on the UI interface according to a pressure operation of the user on the display 605. The fingerprint sensor 614 is configured to collect a user's fingerprint, and the processor 601 identifies a user's identity according to the fingerprint collected by the fingerprint sensor 614, or the fingerprint sensor 614 identifies a user's identity according to the collected fingerprint. The optical sensor 615 is configured to collect ambient light intensity. The proximity sensor 616, also referred to as a distance sensor, is usually disposed on a front panel of the terminal 600. The proximity sensor 616 is configured to collect a distance between a user and the front surface of the terminal 600.

A person skilled in the art may understand that the structure shown in FIG. 6 does not constitute a limitation on the terminal 600, and the terminal may include more or fewer components than those shown in the figure, or some components may be combined, or a different component deployment may be used.

Figure 7:
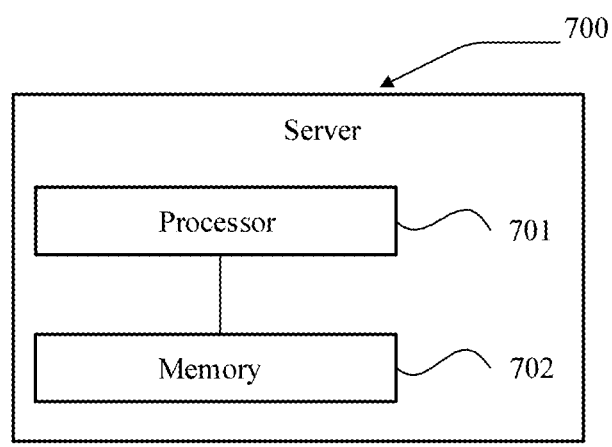
FIG. 7 is a schematic structural diagram of a server according to an embodiment of this application.

FIG. 7 is a schematic structural diagram of a server according to an embodiment of this application. The server 700 may vary greatly due to different configurations or performance, and may include processing circuitry, such as one or more central processing units (CPUs) 701, and one or more memories 702. The memory 702 stores at least one instruction, the at least one instruction being loaded and executed by the processor 701 to implement the methods provided in the foregoing method embodiments. Of course, the server may further include a display and an input apparatus. The display of the computer device may be a liquid crystal display or an e-ink display. The input apparatus of the computer device may be a touch layer covering the display, or may be a button, a trackball, or a touchpad disposed on a housing of the computer device, or may be an external keyboard, a touchpad, a mouse, or the like.

The server 700 may be configured to perform steps performed by the terminal in the foregoing method for training a feature extraction model.

An embodiment of this application further provides a computer device, including a processor and a memory, the memory storing at least one instruction, at least one program, a code set, or an instruction set, and the at least one instruction, the at least one program, the code set, or the instruction set being loaded and executed by the processor to implement operations performed in the method for training a feature extraction model in the foregoing embodiments.

An embodiment of this application further provides a non-transitory computer-readable storage medium, storing at least one instruction, at least one program, a code set, or an instruction set, and the at least one instruction, the at least one program, the code set, or the instruction set being loaded and executed by a processor to implement operations performed in the method for training a feature extraction model in the foregoing embodiments.

A person of ordinary skill in the art may understand that all or some of the steps in the foregoing exemplary embodiments may be implemented by hardware or by a program instructing relevant hardware. The program may be stored in a computer-readable storage medium. During execution of the program, processes of the foregoing method embodiments may be included. Any reference to a memory, storage, database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A method for training a feature extraction model that is performed by a computer device, the method comprising:
   detecting a plurality of images in one or more sample videos, the plurality of images including a same object;
   selecting at least two images from the plurality of images that include the same object as sample images for training the feature extraction model, the at least two images including a first image and a second image, the at least two images indicating a change of the object in a time dimension; and
   training the feature extraction model based on the sample images and a preset loss function to extract a video feature of a target video,
   the preset loss function including at least the following information entropy loss function:

$$L_b = \sum_d (u - 0.5)^2,$$

where $L_b$ represents an information entropy loss function, and u represents a sample feature average value of the sample images.

2. The method according to claim 1, wherein the detecting the plurality of images in the one or more sample videos further comprises:
   detecting the first image in the one or more sample videos to determine a first object included in the first image; and
   tracking the first object in an image other than the first image to obtain the second image including the first object.

3. The method according to claim 2, wherein
   the tracking further includes tracking the first object in the image other than the first image to obtain a plurality of other images including the first object; and
   the selecting includes selecting the second image including the first object from the plurality of other images by selecting an image with a distance from the first image greater than a preset distance, where the distance is a quantity of images between the first and second images.

4. The method according to claim 1, wherein the training based on the sample images further comprises:
   training based on the sample images and the preset loss function to obtain the feature extraction model, so that the feature extraction model meets a target that the preset loss function is minimum.

5. The method according to claim 4, wherein the preset loss function further comprises a distance loss function and a quantification loss function;
   the distance loss function being:
   $L_f = \max\{(x_a - x_p) + m - (x_a - x_n)\}$; and
   the quantification loss function being:

$$L_q = \begin{cases} x^2, & x < 0.5 \\ (x-1)^2, & x \geq 0.5 \end{cases},$$

where $L_t$ represents the distance loss function, $x_a$ represents a sample feature of any specified sample image, $x_p$ represents a sample feature of a sample image with a label the same as that of the specified sample image, $x_n$ represents a sample feature of a sample image with a label different from that of the specified sample image, m represents a distance constant, and m is greater than 0; $L_q$ represents the distance loss function, x represents any value in a sample feature of any sample image, and x is greater than 0.

6. The method according to claim 1, wherein after the training based on the sample images, the method further comprises:

obtaining at least one image in the target video; and performing feature extraction on the at least one image based on the feature extraction model to obtain the video feature of the target video.

7. The method according to claim 6, wherein after the performing the feature extraction on the at least one image based on the feature extraction model, the method further comprises:

storing the video feature and video information of the target video in a database; or querying, in the database, the video information corresponding to the video feature, the database being configured to store a video feature and video information of each video.

8. An apparatus for training a feature extraction model, comprising processing circuitry that is configured to:

detect a plurality of images in one or more sample videos, the plurality of images including a same object;

select at least two images from the plurality of images that include the same object as sample images for training the feature extraction model, the at least two images including a first image and a second image, the at least two images indicating a change of the object in a time dimension; and train the feature extraction model based on the sample images and a preset loss function to extract a video feature of a target video, the preset loss function including at least the following information entropy loss function:

$$L_b = \sum_d (u - 0.5)^2,$$

where $L_b$ represents an information entropy loss function, and u represents a sample feature average value of the sample images.

9. The apparatus according to claim 8, wherein the processing circuitry is further configured to:

detect the first image in the one or more sample videos to determine a first object included in the first image; and track the first object in an image other than the first image to obtain the second image including the first object.

10. The apparatus according to claim 9, wherein the processing circuitry is further configured to:

track the first object in the image other than the first image to obtain a plurality of other images including the first object; and select the second image including the first object from the plurality of other images by selecting an image with a distance from the first image greater than a preset distance, where the distance is a quantity of images between the first and second images.

11. The apparatus according to claim 8, wherein the processing circuitry is further configured to train according to the sample images and the preset loss function to obtain the feature extraction model so that the feature extraction model meets a target that the preset loss function is minimum.

12. The apparatus according to claim 11, wherein the preset loss function further comprises a distance loss function and a quantification loss function;

the distance loss function is as follows:

$L_t = \max\{(x_a - x_p) + m - (x_a - x_n), 0\}$; and the quantification loss function is as follows:

$$L_q = \begin{cases} x^2, & x < 0.5 \\ (x-1)^2, & x \geq 0.5 \end{cases},$$

where $L_t$ represents the distance loss function, $x_a$ represents a sample feature of any specified sample image, $x_p$ represents a sample feature of a sample image with a label the same as that of the specified sample image, $x_n$ represents a sample feature of a sample image with a label different from that of the specified sample image, m represents a distance constant, and m is greater than 0; $L_q$ represents the distance loss function, x represents any value in a sample feature of any sample image, and x is greater than 0.

13. The apparatus according to claim 8, wherein the processing circuitry is further configured to:

obtain at least one image in the target video; and perform feature extraction on the at least one image based on the feature extraction model to obtain the video feature of the target video.

14. A computer device, comprising a processor and a memory, the memory storing at least one instruction that, when executed by the processor, causes the processor to perform the method recited in claim 1.

15. The computer device according to claim 14, wherein, when the selecting at least two images is performed, the computer device further performs:

detecting the first image in the one or more sample videos to determine a first object included in the first image; and tracking the first object in an image other than the first image to obtain the second image including the first object.

16. The computer device according to claim 15, wherein when the tracking the first object in the image other than the first image to obtain the second image including the first object is performed, the computer device further performs tracking the first object in the image other than the first image to obtain a plurality of other images including the first object; and the selecting includes selecting the second image including the first object from the plurality of other images by selecting an image with a distance from the first image greater than a preset distance, where the distance is a quantity of images between the first and second images.

17. The computer device according to claim 14, wherein, when the training according to the sample images to obtain the feature extraction model is performed, the computer device further performs:

training according to the sample images and the preset loss function to obtain the feature extraction model, so that the feature extraction model meets a target that the preset loss function is minimum.

18. A non-transitory computer-readable storage medium storing at least one instruction that, when executed by a processor, causes the processor to perform:

detecting a plurality of images in one or more sample videos, the plurality of images including a same object;

selecting at least two images from the plurality of images that include the same object as sample images for training a feature extraction model, the at least two images including a first image and a second image, the at least two images indicating a change of the object in a time dimension; and training the feature extraction model based on the sample images and a preset loss function to extract a video feature of a target video, the preset loss function including at least the following information entropy loss function:

$$L_b = \sum_d (u - 0.5)^2,$$

where $L_b$ represents an information entropy loss function, and u represents a sample feature average value of the sample images.

19. The non-transitory computer-readable storage medium according to claim 18, wherein the detecting comprises:

detecting the first image in the one or more sample videos to determine a first object included in the first image; and tracking the first object in an image other than the first image to obtain the second image including the first object.

20. The non-transitory computer-readable storage medium according to claim 19, wherein the tracking further includes tracking the first object in the image other than the first image to obtain a plurality of other images including the first object; and the selecting includes selecting the second image including the first object from the plurality of other images by selecting an image with a distance from the first image greater than a preset distance, where the distance is a quantity of images between the first and second images.

* * * * *